US012609395B2

(12) United States Patent
Ju et al.

(10) Patent No.: US 12,609,395 B2
(45) Date of Patent: Apr. 21, 2026

(54) BATTERY PACK AND VEHICLE INCLUDING SAME

(71) Applicant: LG ENERGY SOLUTION, LTD., Seoul (KR)

(72) Inventors: Eun-Ah Ju, Daejeon (KR); Sung-Won Seo, Daejeon (KR); Hyeon-Ki Yun, Daejeon (KR); Jeong-O Mun, Daejeon (KR); Guenter Tannenberger, Pobenhausen (DE); Uwe Harasztosi, Neckarsulm (DE)

(73) Assignee: LG ENERGY SOLUTION, LTD., Seoul (KR)

( * ) Notice: Subject to any disclaimer, the term of this patent is extended or adjusted under 35 U.S.C. 154(b) by 643 days.

(21) Appl. No.: 18/012,850

(22) PCT Filed: Sep. 27, 2021

(86) PCT No.: PCT/KR2021/013158
§ 371 (c)(1),
(2) Date: Dec. 23, 2022

(87) PCT Pub. No.: WO2022/065961
PCT Pub. Date: Mar. 31, 2022

(65) Prior Publication Data
US 2023/0268599 A1 Aug. 24, 2023

(30) Foreign Application Priority Data
Sep. 28, 2020 (KR) ........................ 10-2020-0126153

(51) Int. Cl.
H01M 50/262 (2021.01)
H01M 50/209 (2021.01)

(52) U.S. Cl.
CPC ....... H01M 50/262 (2021.01); H01M 50/209 (2021.01)

(58) Field of Classification Search
CPC ............. H01M 50/262; H01M 50/209; H01M 2220/20; H01M 10/613; H01M 10/625;
(Continued)

(56) References Cited
U.S. PATENT DOCUMENTS

2019/0131674 A1 5/2019 Lu et al.
2019/0148689 A1 5/2019 Keum
(Continued)

FOREIGN PATENT DOCUMENTS

CN 109994798 A 7/2019
CN 110800124 A 2/2020
(Continued)

OTHER PUBLICATIONS

International Search Report (PCT/ISA/210) issued in PCT/KR2021/013158, dated Jan. 17, 2022.

*Primary Examiner* — Daniel S Gatewood
(74) *Attorney, Agent, or Firm* — Birch, Stewart, Kolasch & Birch, LLP

(57) ABSTRACT

Discussed is a battery pack that can include a plurality of battery modules each including at least one battery cell, a pack housing supporting the plurality of battery modules, and a plurality of mounting units coupled to the pack housing, located between the plurality of battery modules, and configured to press the plurality of battery modules toward the pack housing.

12 Claims, 7 Drawing Sheets

(58) Field of Classification Search
CPC .......... H01M 10/647; H01M 10/6554; H01M 10/6556; H01M 50/204; H01M 50/224; H01M 50/242; H01M 50/249; H01M 50/264; H01M 50/20; Y02E 60/10
See application file for complete search history.

(56) References Cited

U.S. PATENT DOCUMENTS

| | | | |
|---|---|---|---|
| 2019/0198952 A1 | 6/2019 | Choi et al. |
| 2019/0267682 A1 | 8/2019 | Seo et al. |
| 2019/0326569 A1 | 10/2019 | Chi et al. |
| 2020/0044213 A1 | 2/2020 | Park et al. |
| 2020/0144570 A1 | 5/2020 | Ju et al. |
| 2020/0411815 A1 | 12/2020 | Shin et al. |
| 2021/0083243 A1 | 3/2021 | Nakamoto et al. |
| 2023/0223615 A1 | 7/2023 | Shin et al. |

FOREIGN PATENT DOCUMENTS

| | | | | |
|---|---|---|---|---|
| CN | 111095597 A | | 5/2020 | |
| CN | 111712940 A | | 9/2020 | |
| JP | 8-118138 A | | 5/1897 | |
| JP | 7-25247 A | | 1/1995 | |
| JP | 2003237381 A | * | 8/2003 | |
| JP | 2012-84239 A | | 4/2012 | |
| JP | 2012084239 A | * | 4/2012 | |
| JP | 2317-142836 A | | 8/2017 | |
| JP | 2017-196958 A | | 11/2017 | |
| JP | 2020-59354 A | | 4/2020 | |
| JP | 2920-149951 A | | 9/2020 | |
| KR | 10-2018-0112617 A | | 10/2018 | |
| KR | 10-2018-0113906 A | | 10/2018 | |
| KR | 10-2019-0000210 A | | 1/2019 | |
| KR | 10-2019-0054806 A | | 5/2019 | |
| KR | 10-2019-0078386 A | | 7/2019 | |
| KR | 10-2019-0087746 A | | 7/2019 | |
| KR | 20190087746 A | * | 7/2019 | ........ H01M 10/6551 |

* cited by examiner

BATTERY PACK AND VEHICLE INCLUDING SAME

TECHNICAL FIELD

The present disclosure relates to a battery pack and a vehicle including the same.

The present application claims priority to Korean Patent Application No. 10-2020-0126153 filed on Sep. 28, 2020 in the Republic of Korea, the disclosures of which are incorporated herein by reference.

BACKGROUND ART

Secondary batteries have high applicability according to product groups and electrical characteristics such as high energy density, and thus, are commonly applied not only to mobile devices but also to electric vehicles (EVs) or hybrid vehicles (HEVs) driven by electric power sources. Because secondary batteries may radically reduce the use of fossil fuel and do not generate any by-products that come with energy consumption, the secondary batteries are gaining attention as a new alternative energy source for improving eco-friendliness and energy efficiency.

Types of secondary batteries that are currently widely used include lithium-ion batteries, lithium polymer batteries, nickel cadmium batteries, nickel hydride batteries, and nickel zinc batteries. An operating voltage of a unit secondary battery cell, that is, a unit battery cell, ranges from about 2.5 V to about 4.5 V. Accordingly, when a higher output voltage is required, a battery pack may be configured by connecting a plurality of battery cells in series. Also, a battery pack may be configured by connecting a plurality of battery cells in parallel according to charge/discharge capacity required for the battery pack. Accordingly, the number of battery cells included in a battery pack may be set in various ways according to a required output voltage or charge/discharge capacity.

When a battery pack is configured by connecting a plurality of battery cells in series/parallel, a method of first configuring a battery module including at least one battery cell and adding other elements by using the at least one battery module to configure a battery pack or a battery rack is general.

A conventional battery pack generally includes a plurality of battery modules and a pack housing supporting the plurality of battery modules. A mounting space having a certain size is required to fix the plurality of battery modules and the pack housing.

To this end, in the conventional battery pack, a size of the pack housing should be further increased for an additional mounting space in the pack housing, and in the case of the battery modules, a structure such as a separate mounting plate for mounding is additionally provided.

The additional mounting space and the structure such as the separate mounting plate inevitably reduce the energy density of the battery pack and increase the weight of the battery pack.

Hence, there is a demand to provide a battery pack having a more compact structure and higher energy density and a vehicle including the battery pack.

DISCLOSURE

Technical Problem

Accordingly, an objective of the present disclosure is to provide a battery pack having a more compact structure and higher energy density and a vehicle including the battery pack.

Technical Solution

In an aspect of the present disclosure, there is provided a battery pack including: a plurality of battery modules each including at least one battery cell; a pack housing supporting the plurality of battery modules; and a plurality of mounting units coupled to the pack housing, located between the plurality of battery modules, and configured to press the plurality of battery modules toward the pack housing.

Each of the plurality of mounting units may include: a pressing bar located between facing battery modules in a width direction of the pack housing, and having a certain length in a longitudinal direction of the facing battery modules from among the plurality of battery modules; and at least one mounting bolt passing through the pressing bar and fastened to the pack housing.

At least one bolt hole through which the at least one mounting bolt passes may be formed in the pressing bar.

Side surfaces of the pressing bar may have shapes corresponding to side surfaces of the facing battery modules.

Each of the plurality of battery modules may include: a battery cell assembly including a plurality of battery cells; and a pair of side plates provided on opposite side surfaces of the battery cell assembly, and wherein each side plate of the pair of side plates includes a protruding end protruding by a certain length on a lower portion of a side surface of each side plate.

The protruding end may include: an inclined portion inclined at a certain angle from the lower portion of the side surface of the side plate; and a vertical portion vertically extending from the inclined portion toward the pack housing, and located at a lower end of the side surface of the side plate.

The pressing bar may be located on top surfaces of inclined portions of the pair of side plates facing each other, and has a shape corresponding to the inclined portions.

The at least one mounting bolt may be located between vertical portions of the pair of side plates facing each other, and fastened to the pack housing between the vertical portions.

Each of the plurality of battery modules may include at least one heat transfer material located between the battery cell assembly and the pack housing.

In another aspect of the present disclosure, there is also provided a vehicle including at least one battery pack according to the above embodiments.

Advantageous Effects

According to the various embodiments, a battery pack having a more compact structure and higher energy density and a vehicle including the battery pack may be provided.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

The present disclosure will now be described more fully with reference to the accompanying drawings, in which exemplary embodiments of the present disclosure are shown. These embodiments are provided so that the present disclosure will be thorough and complete, and will fully convey the concept of the present disclosure to one of ordinary skill in the art, and the present disclosure may be embodied in many different forms and should not be construed as being limited to the embodiments set forth herein. In addition, in order to help the understanding of the present disclosure, the accompanying drawings are not drawn to scale, but dimensions of some components may be exaggerated.

Figure 1:
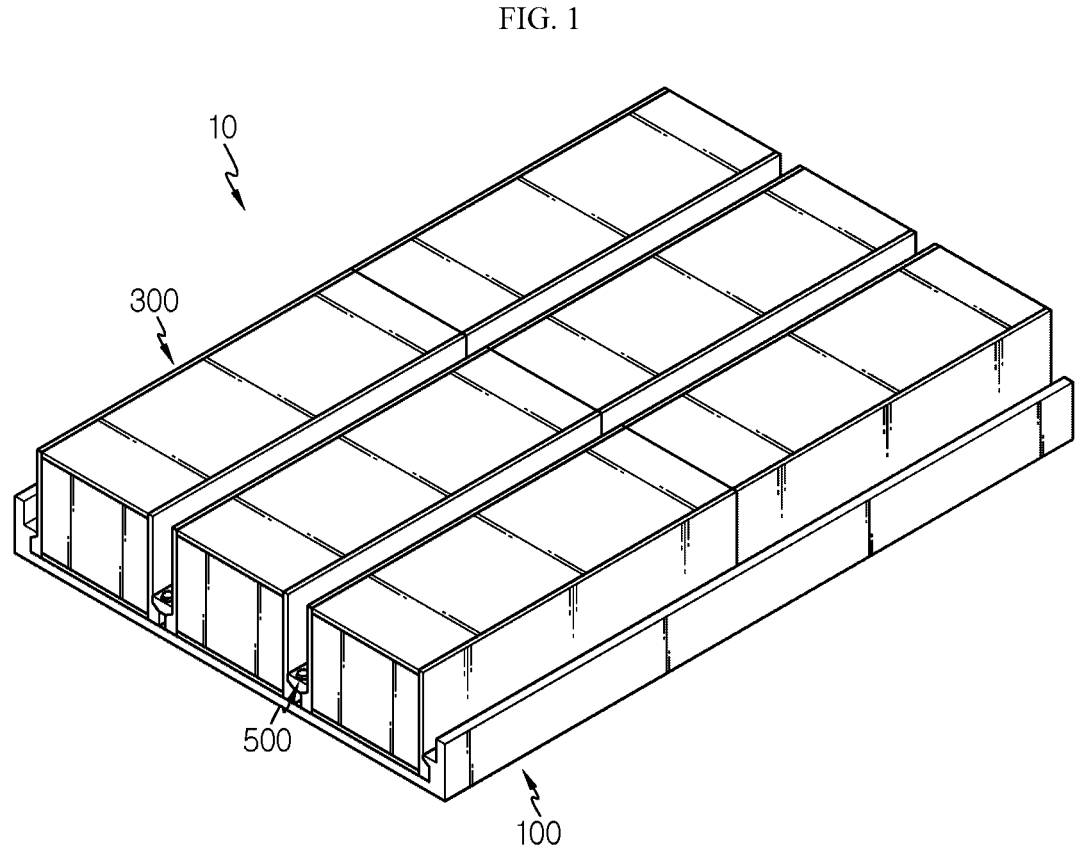
FIG. 1 is a view for describing a battery pack, according to an embodiment of the present disclosure.
Figure 2:
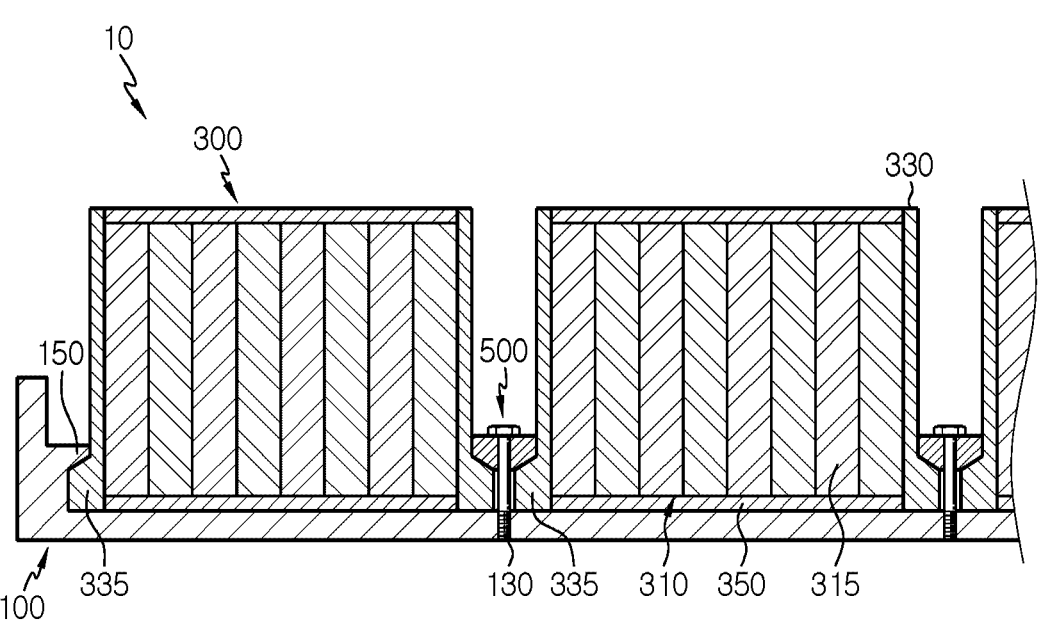
FIG. 2 is a cross-sectional view illustrating the battery pack of FIG. 1.
Figure 3:
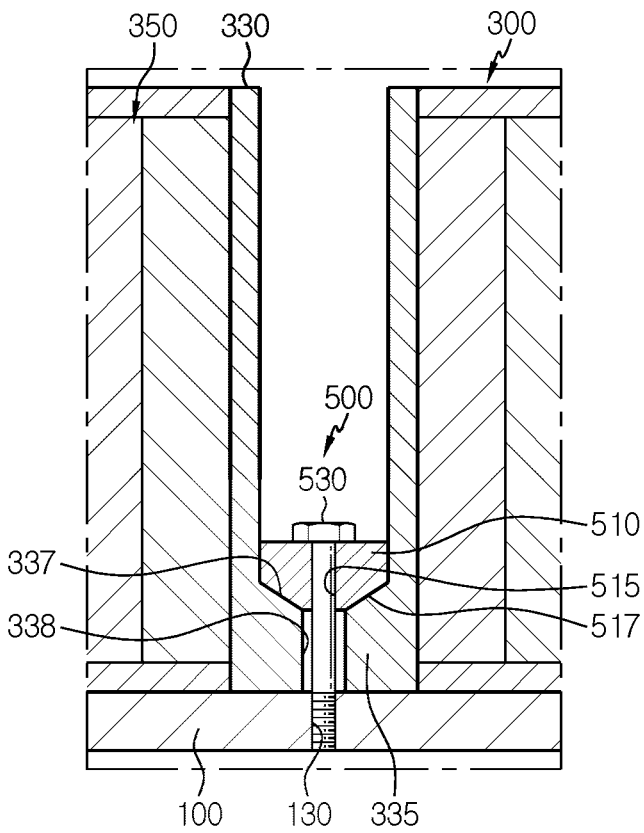
FIG. 3 is an enlarged view illustrating main elements of the battery pack of FIG. 2.
Figure 4:
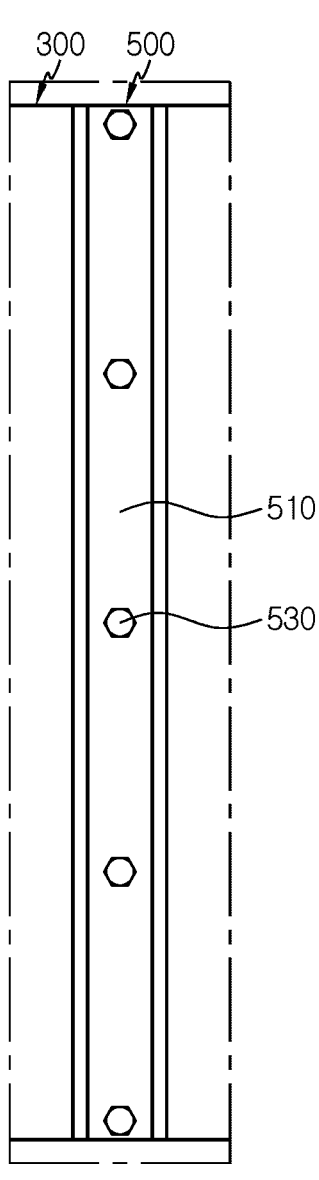
FIG. 4 is a plan view illustrating main elements of the battery pack of FIG. 1.
Figure 5:
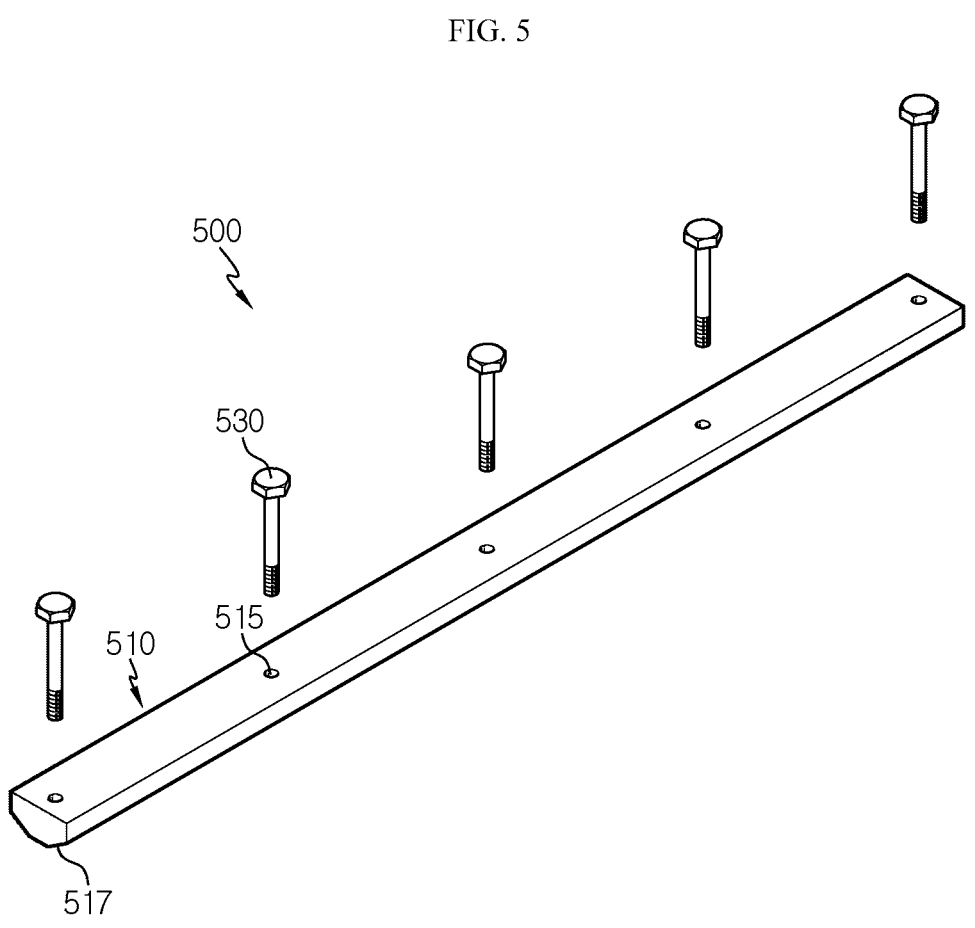
FIG. 5 is an exploded perspective view illustrating a mounting unit of the battery pack of FIG. 1.
Figure 6:
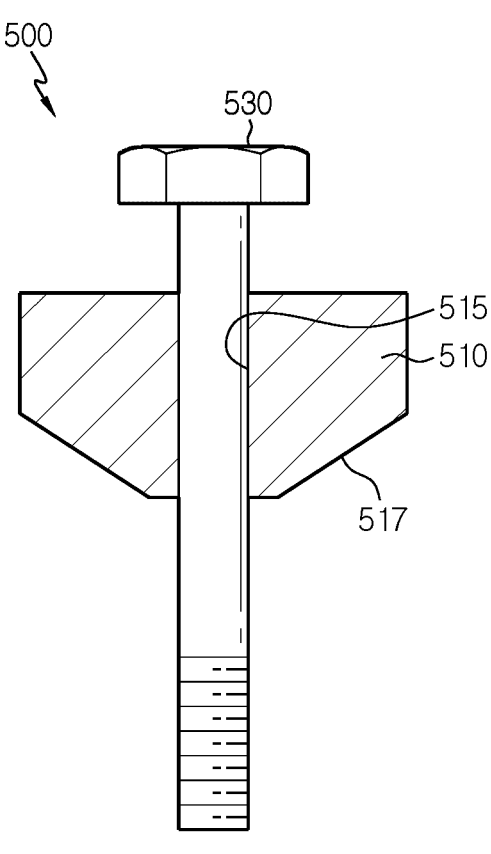
FIG. 6 is a cross-sectional view illustrating the mounting unit of FIG. 5.

FIG. 1 is a view for describing a battery pack, according to an embodiment of the present disclosure. FIG. 2 is a cross-sectional view illustrating the battery pack of FIG. 1. FIG. 3 is an enlarged view illustrating main elements of the battery pack of FIG. 2. FIG. 4 is a plan view illustrating main elements of the battery pack of FIG. 1. FIG. 5 is an exploded perspective view illustrating a mounting unit of the battery pack of FIG. 1. FIG. 6 is a cross-sectional view illustrating the mounting unit of FIG. 5.

Referring to FIGS. 1 through 6, a battery pack 10 may include a pack housing 100, a plurality of battery modules 300, and a plurality of mounting units 500.

The pack housing 100 may be mounted in a vehicle or the like, and may support the plurality of battery modules 300 described below. To this end, the pack housing 100 may have a size large enough to accommodate the plurality of battery modules 300 described below.

The pack housing 100 may include a fastening hole 130 and module fixing portions 150.

The fastening hole 130 may be provided at the bottom of the pack housing 100, and a plurality of fastening holes 130 may be provided. A mounting bolt 530 of the mounting unit 500 described may be screwed into each of the plurality of fastening holes 130.

The module fixing portions 150 may be provided on inner walls of both side surfaces of the pack housing 100. Each module fixing portion 150 may have a shape corresponding to a protruding end 335 of a side plate 330 of the battery module 300 described below.

When the plurality of battery modules 300 described below are mounted on the pack housing 100, the protruding ends 335 of both outermost battery modules 300 may be inserted into the module fixing portions 150. Accordingly, when the battery modules 300 described below are mounted on the pack housing 100, the battery modules 300 may be more stably fixed to the pack housing 100.

The plurality of battery modules 300 may be seated and fixed to the pack housing 100. Each of the plurality of battery modules 300 may include a battery cell assembly 310, a pair of side plates 330, and a heat transfer material 350.

The battery cell assembly 310 may include at least one or more battery cells 315. The present embodiment will be described assuming that the battery cell assembly 310 includes a plurality of battery cells 315.

The plurality of battery cells 315 may be pouch-type secondary batteries, prismatic secondary batteries, or cylindrical secondary batteries. The present embodiment will be described assuming that the plurality of battery cells 315 are pouch-type secondary batteries.

The pair of side plates 330 may be provided on both side surfaces of the battery cell assembly 310. The protruding ends 335 protruding by a certain length may be provided on lower portions of side surfaces of the pair of side plates 330.

Each of the protruding ends 335 may include an inclined portion 337 and a vertical portion 338.

The inclined portion 337 may be inclined at a certain angle from the lower portion of the side surface of the side plate 330. In detail, the inclined portion 337 may be inclined at a certain angle downward from the lower portion of the side surface of the side plate 330.

The vertical portion 338 may vertically extend from the inclined portion 337 toward the pack housing 100, and may be located at a lower end of the side surface of the side plate 330. When the battery modules 300 are mounted on the pack housing 100, the vertical portion 338 may be spaced apart by a certain distance from the vertical portion 338 of the side plate 330 of a facing battery module 300. In addition, when the battery modules 300 are mounted on the pack housing 100, the fastening hole 130 of the pack housing 100 may be located under a certain space between facing vertical portions 338.

A plurality of heat transfer materials 350 may be provided, and may be located between the battery cell assembly 310 and the pack housing 100. The heat transfer materials 350 may contact the battery cell assembly 310 and the pack housing 100, and may transfer heat generated by the battery cell assembly 310 to the pack housing 100 to guide cooling of the battery cells 315 of the battery cell assembly 310.

The plurality of mounting units 500 may be coupled to the pack housing 100, and may be located between the plurality of battery modules 300 and may press the plurality of battery modules 300 toward the pack housing 100.

Each of the plurality of mounting units 500 may include a pressing bar 510 and a mounting bolt 530.

When the mounting unit 500 is fastened, the pressing bar 510 may press downward the plurality of battery modules 300 to guide more stable mounting of the battery modules 300 toward the pack housing 100.

The pressing bar 510 may be located between facing battery modules 300 in a width direction of the pack housing 100, and may be formed to have a certain length in a longitudinal direction of the battery module 300. The pressing bar 510 located between the facing battery modules 300 may reinforce the rigidity of the battery modules 300.

Side surfaces of the pressing bar 510 may have shapes corresponding to side surfaces of the facing battery modules 300. In detail, the pressing bar 510 may be located on top surfaces of the inclined portions 337 of the protruding ends 335 of the facing side plates 330, and may have a shape corresponding to the inclined portions 337. Accordingly, a lower portion of the side surface of the pressing portion 510 may be inclined downward at a certain angle corresponding to the inclined portion 337.

A bolt hole 515 through which at least one mounting bolt 530 described below passes may be formed in the pressing bar 510. At least one or more bolt holes 515 may be provided. The present embodiment will be described assuming that a plurality of bolt holes 515 are provided.

The plurality of bolt holes 515 may be spaced apart from one another by a certain distance in a longitudinal direction of the pressing bar 510. Each of the plurality of bolt holes 515 may pass through the pressing bar 510 in a height direction of the pressing bar 510.

The mounting bolt 530 may pass through the pressing bar 510 and may be fastened to the pack housing 100. In detail, the mounting bolt 530 may pass through the bolt hole 515 of the pressing bar 510, and may be screwed into the fastening hole 130 of the pack housing 100.

In more detail, when the battery modules 300 are mounted on the pack housing 100, the mounting bolt 530 may be located between the vertical portions 338 of the protruding ends 335 of the facing side plates 335, and may be screwed into the fastening hole 130 of the pack housing 100 between the vertical portions 338.

At least one or more mounting bolts 530 may be provided. The present embodiment will be described assuming that a plurality of mounting bolts 530 are provided.

A mounting mechanism of the plurality of battery modules 300 fixed to the pack housing 100 through the mounting unit 500 according to the present embodiment will be described in more detail.

Figure 7:
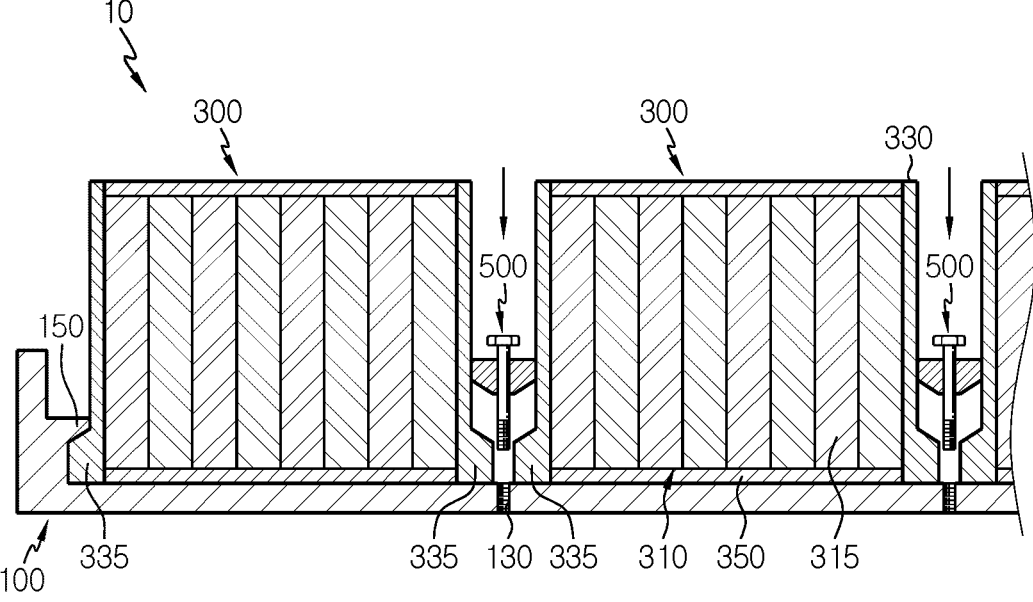
FIGS. 7 and 8 are views for describing battery modules fixed to a pack housing through a mounting unit of FIG. 1.
Figure 8:
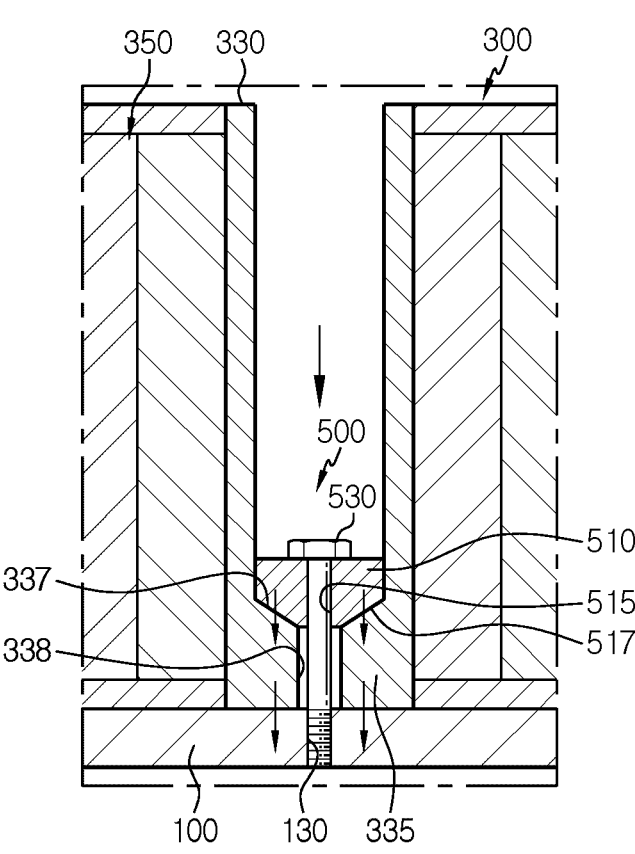

FIGS. 7 and 8 are views for describing battery modules fixed to a pack housing through the mounting unit of FIG. 1.

Referring to FIGS. 7 and 8, when the plurality of modules 300 are mount on the pack housing 100, the plurality of battery modules 300 may be fixed to the pack housing 100 through the plurality of mounting units 500.

First, a manufacturer or a worker may seat the plurality of battery modules 300 on the pack housing 100. In this case, the protruding ends 335 of the side plates 330 of the battery modules 300 facing both inner walls of the pack housing 100 may be inserted into the mounting fixing portions 150 of the pack housing 100.

When the battery modules 300 are seated on the pack housing 100, the worker or the like may more stably fix the battery modules 300 by fastening the plurality of mounting units 500 to the pack housing 100.

In detail, each mounting unit 500 may be screwed into the fastening hole 130 of the pack housing 100 while moving downward in a space between the facing side plates 330 of the battery modules 300. In more detail, the mounting bolt 530 passing through the pressing bar 510 of the mounting unit 500 may be screwed into the fastening hole 130.

As the mounting bolt 530 is screwed, the pressing bar 510 having the inclined side surface 517 may press downward top surfaces of the protruding ends 335 of the side plates 330 of the facing battery modules 300, specifically, the inclined portions 337 of the protruding ends 335.

Because the protruding ends 335 of the side plates 330 of the facing battery modules 300 are pressed downward by the pressing bar 510, the plurality of battery modules 300 may be more stably fixed and supported on the pack housing 100 without movement.

As such, in the battery pack 10 according to the present embodiment, because the mounting unit 500 is fastened to the pack housing 100 in a space between the battery modules 300, to guide more stable fixing of the battery modules 300.

Accordingly, in the present embodiment, because the mounting unit 500 is fastened by using a space between the plurality of battery modules 300, the battery modules 300 may be stably fixed to the pack housing 100 without an additional separate mounting space in the pack housing 100.

Also, in the present embodiment, because the battery modules 300 are fixed to the pack housing 100 through the mounting unit 500 having a simple structure, a separate mounting plate having a significant size and a fastening structure fixing such a plate are not required, thereby reducing manufacturing costs of the battery pack 10 and significantly reducing the manufacturing time.

In addition, in the present embodiment, because an additional mounting space and a structure such as a separate mounting plate are not required, the energy density of the battery pack 10 may be increased and the weight of the battery pack 10 may be reduced, thereby providing the battery pack 10 having a more compact structure.

Figure 9:
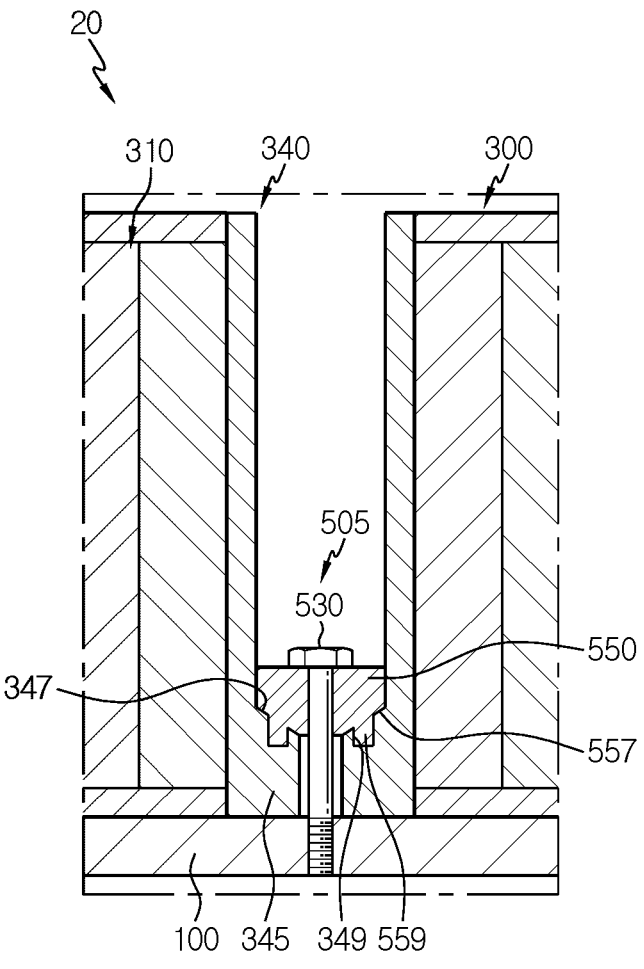
FIG. 9 is a view for describing a battery pack, according to another embodiment of the present disclosure.

FIG. 9 is a view for describing a battery pack, according to another embodiment of the present disclosure.

A battery pack 20 according to the present embodiment is similar to the battery pack 10 of the above embodiment, and thus, a repeated description of elements which are substantially the same as or similar to those in the above embodiment will be omitted and a difference from the above embodiment will be mainly described.

Referring to FIG. 9, a protrusion insertion groove 349 may be formed in a side plate 340 of the battery module 300 of the battery pack 20.

The protrusion insertion groove 349 may be provided in an inclined portion 347 of a protruding end 345 of the side plate 340. The protrusion insertion groove 349 may be formed downward to a certain depth from a top surface of the inclined portion 347.

A plate insertion protrusion 559 may be provided on a mounting unit 505 of the battery pack 20.

The plate insertion protrusions 559 may be provided on both inclined side surfaces 557 of a pressing portion 550 of the mounting unit 505. The plate insertion protrusion 559 may have a shape corresponding to the protrusion insertion groove 349.

In the battery pack 20 according to the present embodiment, when the pressing portion 550 of the mounting unit 505 presses downward the protruding ends 345 of facing side plates 340, the plate insertion protrusion 559 may be inserted into the protrusion insertion groove 349.

In the present embodiment, because the downward pressing is performed while the plate insertion protrusion 559 is inserted into the protrusion insertion groove 349, the movement or positional deviation of the battery modules 300 during the downward pressing may be minimized, and problems such as an assembly tolerance which may occur during the downward pressing may be significantly reduced.

Figure 10:
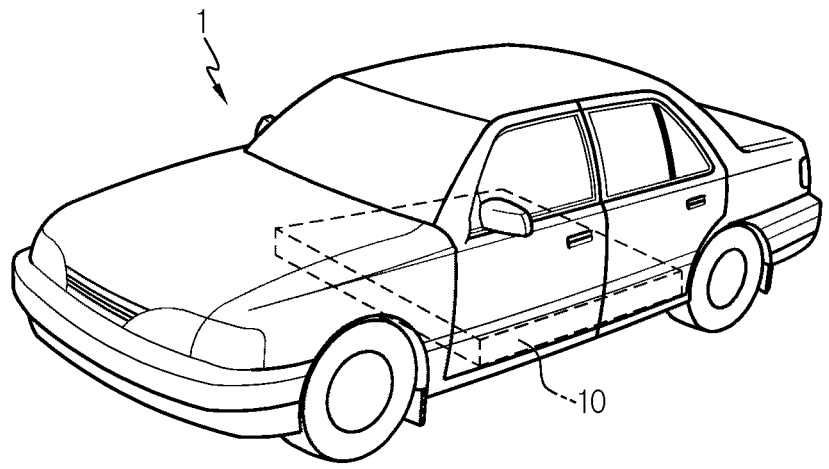
FIG. 10 is a view for describing a vehicle, according to an embodiment of the present disclosure.

FIG. 10 is a view for describing a vehicle, according to an embodiment of the present disclosure.

A vehicle 1 according to the present embodiment may include at least one battery pack 10 of the above embodiment. This is merely an example, and the vehicle 1 may include at least one battery pack 20 (see FIG. 9) of the above embodiment, or may include a combination of the battery pack 10 and the battery pack 20.

The battery pack 10 provided in the vehicle 1 may be provided as a fuel source of the vehicle. For example, the battery pack 10 may be provided in the vehicle 1 such as an electric vehicle, a hybrid vehicle, or another type of vehicle which may use the battery pack 10 as a fuel source.

Also, the battery pack 10 may be provided in another device, mechanism, or equipment such as an energy storage system using a secondary battery, in addition to the vehicle 1.

According to the above various embodiments, the battery packs 10, 20 each having a more compact structure and higher energy density and the vehicle 1 including the battery packs 10, 20 may be provided.

While the preferred embodiments of the present disclosure have been shown and described, the present disclosure is not limited to the specific embodiments described above, various modifications may be made by one of ordinary skill in the art to which the present disclosure pertains without departing from the gist of the present disclosure as defined by the claims, and these modifications should not be individually understood from the technical feature or prospect of the present disclosure.

What is claimed is:

1. A battery pack comprising:
a plurality of battery modules each comprising at least one battery cell;
a pack housing supporting the plurality of battery modules; and
a plurality of mounting units coupled to the pack housing, located between the plurality of battery modules, and configured to press the plurality of battery modules toward the pack housing,
wherein each of the plurality of mounting units comprises a pressing bar located between facing battery modules of the plurality of battery modules in a width direction of the pack housing,
wherein each of the plurality of battery modules comprises a pair of side plates provided on opposite side surfaces of a battery cell assembly,
wherein a side plate of the pair of side plates comprises an inclined portion inclined at a certain angle from a lower portion of a side surface of the side plate,
wherein the pressing bar is located on top surfaces of inclined portions of the pair of side plates facing each other, and has a shape corresponding to the inclined portions, and wherein the pressing bar has a greater thickness in a vertical direction at a central portion of the pressing bar than an end portion of the pressing bar.

2. The battery pack of claim 1, wherein each of the plurality of mounting units further comprises:
at least one mounting bolt passing through the pressing bar and fastened to the pack housing.

3. The battery pack of claim 2, wherein at least one bolt hole through which the at least one mounting bolt passes is formed in the pressing bar.

4. The battery pack of claim 2, wherein side surfaces of the pressing bar have shapes corresponding to side surfaces of the facing battery modules.

5. The battery pack of claim 2, wherein each of the plurality of battery modules comprises:
the battery cell assembly comprising a plurality of battery cells, and
wherein each side plate of the pair of side plates includes a protruding end protruding by a certain length on a lower portion of the side surface of the each side plate.

6. The battery pack of claim 5, wherein the protruding end comprises:
the inclined portion; and
a vertical portion vertically extending from the inclined portion toward the pack housing, and located at a lower end of the side surface of the side plate.

7. The battery pack of claim 6, wherein the at least one mounting bolt is located between vertical portions of the pair of side plates facing each other, and fastened to the pack housing between the vertical portions.

8. The battery pack of claim 5, wherein each of the plurality of battery modules comprises at least one heat transfer material located between the battery cell assembly and the pack housing.

9. A vehicle comprising at least one battery pack according to claim 1.

10. The battery pack of claim 1, wherein the pressing bar has a smallest thickness in the vertical direction at a side portion of the pressing bar contacting the side plate of the pair of side plates.

11. The battery pack of claim 6, wherein a thickness of the vertical portion of the protruding end in the vertical direction is greater than the thickness of the pressing bar in the vertical direction.

12. The battery pack of claim 6, wherein a contact area between the inclined portion of the protruding end and the pressing bar is greater than a remaining contact area of the pair of side plates and the pressing bar.

* * * * *